(12) United States Patent
Krush et al.

(10) Patent No.: US 10,286,873 B1
(45) Date of Patent: May 14, 2019

(54) TAILGATE LOCK CONTROLLER

(71) Applicants: Kevin Krush, Plover, WI (US); Darcy Cummings, Plover, WI (US)

(72) Inventors: Kevin Krush, Plover, WI (US); Darcy Cummings, Plover, WI (US)

(*) Notice: Subject to any disclaimer, the term of this patent is extended or adjusted under 35 U.S.C. 154(b) by 0 days.

(21) Appl. No.: 15/467,236

(22) Filed: Mar. 23, 2017

Related U.S. Application Data

(60) Provisional application No. 62/312,164, filed on Mar. 23, 2016.

(51) Int. Cl.
| | |
|---|---|
| *E05B 81/08* | (2014.01) |
| *B60R 25/01* | (2013.01) |
| *B60R 25/24* | (2013.01) |
| *B60R 25/23* | (2013.01) |
| *E05B 83/18* | (2014.01) |
| *G07C 9/00* | (2006.01) |
| *B62D 33/027* | (2006.01) |

(52) U.S. Cl.
CPC .............. *B60R 25/01* (2013.01); *B60R 25/23* (2013.01); *B60R 25/241* (2013.01); *B60R 25/243* (2013.01); *E05B 81/08* (2013.01); *E05B 83/18* (2013.01); *G07C 9/00309* (2013.01); *B60R 2325/105* (2013.01); *B60R 2325/205* (2013.01); *B62D 33/0273* (2013.01)

(58) Field of Classification Search
None
See application file for complete search history.

(56) References Cited

U.S. PATENT DOCUMENTS

| | | | |
|---|---|---|---|
| 5,040,390 A * | 8/1991 | Mistry | E05B 85/10 |
| | | | 292/216 |
| RE38,400 E | 1/2004 | Kowall et al. | |
| 6,769,729 B1 | 8/2004 | Bruford et al. | |
| 7,106,171 B1 * | 9/2006 | Burgess | B60R 25/23 |
| | | | 340/10.42 |
| 7,180,454 B2 * | 2/2007 | Asakura | B60R 25/245 |
| | | | 343/713 |
| 7,375,299 B1 | 5/2008 | Pudney | |
| 7,688,179 B2 * | 3/2010 | Kurpinski | B60R 25/2036 |
| | | | 340/4.1 |
| 8,250,889 B2 * | 8/2012 | Zagoroff | E05B 83/16 |
| | | | 292/144 |
| 8,451,087 B2 * | 5/2013 | Krishnan | B60J 5/04 |
| | | | 292/221 |
| 8,838,333 B2 | 9/2014 | Cheal et al. | |
| 8,872,447 B2 * | 10/2014 | Oakley | B22C 15/20 |
| | | | 318/34 |
| 9,308,802 B2 * | 4/2016 | Warburton | B60J 5/103 |
| 9,499,125 B2 * | 11/2016 | Akay | B60R 25/24 |
| 9,636,978 B2 * | 5/2017 | Warburton | B60J 5/103 |
| 9,725,069 B2 * | 8/2017 | Krishnan | H04W 4/80 |

(Continued)

*Primary Examiner* — K. Wong
(74) *Attorney, Agent, or Firm* — Cramer Patent & Design, PLLC; Aaron R. Cramer

(57) ABSTRACT

A tailgate lock controller device is wirelessly controlled. The tailgate lock is in electrical communication with the automobile's lock controller which in turn is in electrical communication with the automobile's wireless lock sensors. The key fob is in wireless communication with the wireless lock sensors and the automobile's electronic anti-theft features. The tailgate lock is also configured to be actuated by use of a traditional lock and key mechanism, as well as keypads located on the automobile.

6 Claims, 4 Drawing Sheets

(56) References Cited

U.S. PATENT DOCUMENTS

| | | |
|---|---|---|
| 2003/0189481 A1 | 10/2003 | Hamid |
| 2007/0262603 A1 | 11/2007 | Robertson |
| 2014/0136021 A1 | 5/2014 | Bambenek et al. |
| 2015/0019046 A1 | 1/2015 | Jang et al. |
| 2016/0160553 A1* | 6/2016 | Nania .................... E05F 15/627 296/50 |
| 2017/0089116 A1* | 3/2017 | Heiberger ............. E05F 15/614 |

* cited by examiner

TAILGATE LOCK CONTROLLER

RELATED APPLICATIONS

The present invention was first described in and claims the benefit of U.S. Provisional Application No. 62/312,164, filed Mar. 23, 2016, the entire disclosures of which are incorporated herein by reference.

FIELD OF THE INVENTION

The present invention relates generally to a wirelessly controlled tailgate lock controller device.

BACKGROUND OF THE INVENTION

With sales at an all-time high, the popularity of the pickup-style truck as an everyday vehicle is more wide spread than it ever has been. Their utility and convenience in hauling items coupled with the availability of luxury interiors and extended cab space have made the pickup a popular alternative to other vehicles. However, one (1) particular aspect of a pickup truck operation that is very different from a conventional motor vehicle is that of the tailgate. Since the bed is open, a locking system on the tailgate is viewed by many manufacturers as an item that can be easily deleted to save on manufacturing costs. While some manufacturers may provide a manual locking system that requires a key, almost no manufacturers provide a remote wireless locking system for the tailgate.

Unfortunately, this approach has many shortfalls. First, it exposes the tailgate itself to easy theft by allowing any passerby to simply open the tailgate, release a few pins or latches and walk off with it. Second, many pickup truck owners equip their trucks with aftermarket tonneau covers or bed shells which can be locked to provide environmental and theft protection for bed contents. Thus, access to the bed requires the key, if even provided, to lock or unlock the tailgate every time which is in sharp contrast to the convenience provided by wireless key fobs which provide access to the cab. Accordingly, there exists a need for a means by remote locking and unlocking of a pickup truck tailgate can be provided by a wireless key fob in order to address these current limitations. The development of the remote electric locking mechanism for pickup truck tailgate fulfills this need.

SUMMARY OF THE INVENTION

In order to achieve the object of providing for a remote locking mechanism for a tailgate of a vehicle, herein described is a lock adapted to be operatively connected to a handle of the tailgate and at least one (1) first actuating means configured to be in electrical communication with the lock. The first actuating means can be either a keypad located on the driver's side door, a keypad located on the tailgate, or a combination of both. In certain embodiments, a second actuating means is configured to be in wireless communication with the lock. The second actuating means can be a keypad on a key fob, a wireless network communication, or both. In all embodiments, the first and second actuating means can each independently selectively operate the lock to lock and unlock the handle.

Another object of the invention is to provide such a lock that includes an auxiliary linkage capable of removable attachment to and providing operable communication with the handle and a bidirectional solenoid in operable communication with the auxiliary linkage and in electrical communication with any of the actuating means and also being capable of being in electrical communication with a power source of the vehicle.

Another object of the invention is to enable the first and/or second actuating means to operate the lock simultaneously with existing door locks of the vehicle.

Yet another object of the invention is to enable the wireless actuating means to be capable of activating an existing security system of the vehicle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

- 10 remote electric locking mechanism for a pickup truck tailgate
- 15 pickup truck
- 20 tailgate
- 25 wireless key fob transmitter
- 30 RF signal
- 35 protective bed cover
- 36 internet connected device
- 37 first remote transceiver
- 38 internet
- 39 second remote transceiver
- 40 existing locking mechanism
- 45 auxiliary linkage mechanism
- 50 fastening means
- 55 electrical bidirectional solenoid
- 60 wiring harness
- 65 control relay with RF receiver
- 66 remote data transceiver
- 70 auxiliary wiring
- 75 interior switch console
- 80 driver's door locking solenoid
- 85 rear door locking solenoid
- 90 lock pushbutton
- 95 unlock pushbutton
- 100 power source
- 105 transmitter module
- 110 transmitting antenna
- 115 receiving antenna

DETAILED DESCRIPTION OF THE PREFERRED EMBODIMENT

The best mode for carrying out the invention is presented in terms of its preferred embodiment, herein depicted within FIG. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Figure 1:
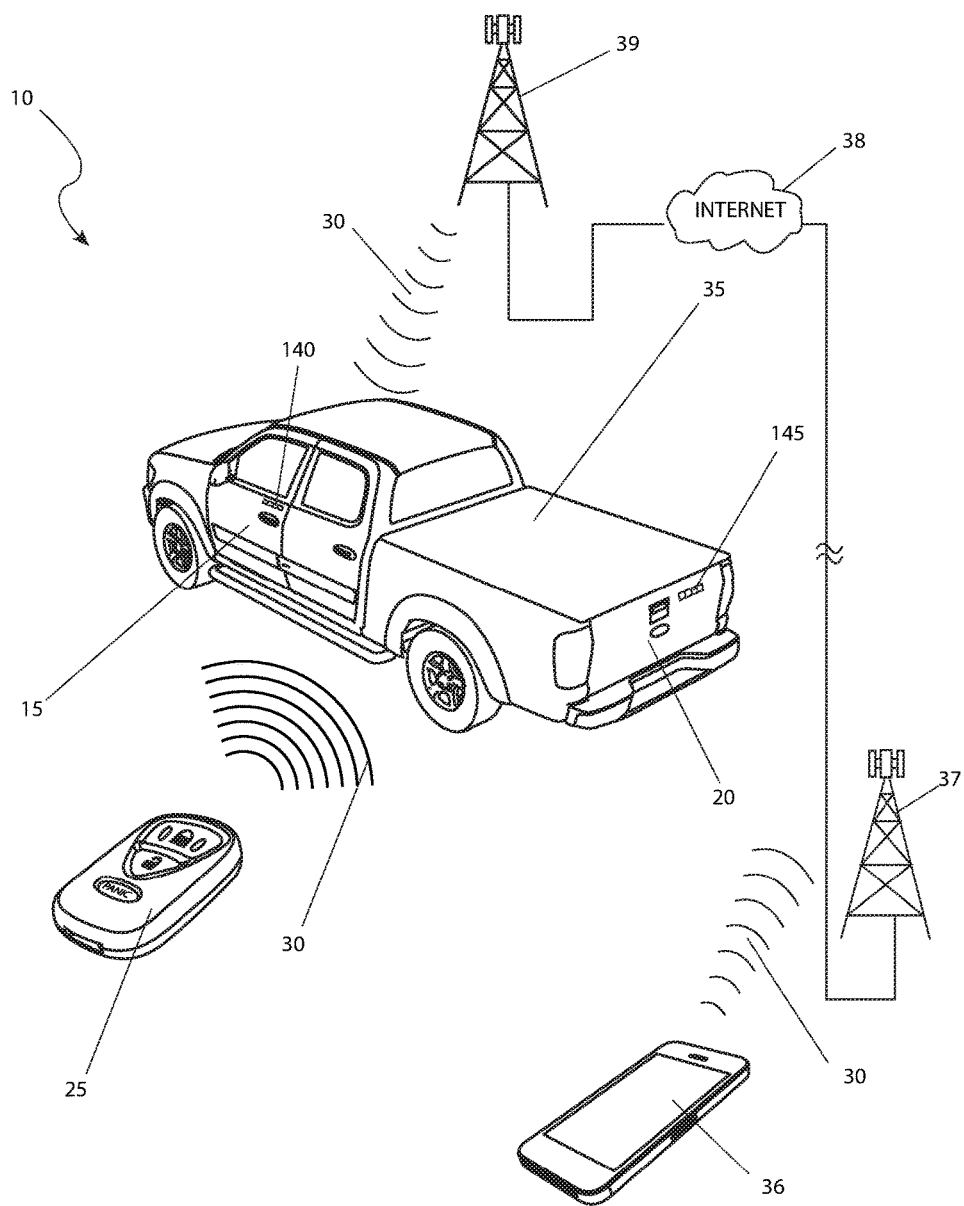
FIG. 1 is an overall perspective view of the remote electric locking mechanism for pickup truck tailgate 10, according to the preferred embodiment of the present invention.

Referring now to FIG. 1, an overall perspective view of the remote electric locking mechanism for a pickup truck tailgate (herein described as the "mechanism") 10, according to the preferred embodiment of the present invention is disclosed. The mechanism 10 is utilized on a pickup truck 15 equipped with a tailgate 20. A wireless key fob transmitter 25 transmits a RF signal 30 which is received by interior components located in the pickup truck 15. Upon receipt of said signal, the mechanism 10 provides an electric signal that can be reversed in polarity to lock or unlock the tailgate 20 respectively. Alternately, a keypad 140 located on the driver's door or a keypad 145 on the tailgate 20 can also actuate the lock on the tailgate 20. It is envisioned that the locking/unlocking operation would be similar in operation to that typically experienced on a motor vehicle.

While the exact scope of the operation can vary per specific model, some specific variations include: 1). a lock button on the wireless key fob transmitter 25 will lock all cab doors on the pickup truck 15 as well as the tailgate 20 while an unlock button on the wireless key fob transmitter 25 will unlock all cab doors on the pickup truck 15 as well as the tailgate 20; 2). a single actuation of the lock button on the wireless key fob transmitter 25 will lock all cab doors on the pickup truck 15; a second immediate actuation of the lock button on the wireless key fob transmitter 25 will actuate a security system; while a single actuation of the unlock button on the wireless key fob transmitter 25 will unlock only the passenger cab door on the pickup truck 15; a second immediate actuation of the unlock button on the wireless key fob transmitter 25 will unlock all remaining cab doors as well as the tailgate 20; 3.) a separate tailgate button on the wireless key fob transmitter 25 will lock only the tailgate when actuated once and unlock when actuated twice in immediate succession; 4). a separate tailgate button on the wireless key fob transmitter 25 will lock only the tailgate when actuated once and unlock when held down for several seconds or more. The embodiment utilizing the driver's door keypad 140 and/or the tailgate keypad 145 would function in a similar manner. These variations are intended to describe the wide variety of operating modes of the mechanism 10. Specific inclusion or exclusion of various modes is not intended to be a limiting factor of the present invention. It is also envisioned that the mechanism 10 would be provided as standard or optional equipment on new pickup truck 15, or could be provided as an aftermarket add-on kit for adaptation of existing pickup truck 15.

In an enhanced embodiment, an internet connected device 36 such as a cellular phone, tablet computer, notebook computer, or the like is connected to a first remote transceiver 37 such as a cellular tower, Wi-Fi hotspot or the like via an RF signal 30. The first remote transceiver 37 is then connected to the internet 38 and an associated vehicle control system database such as OnStar® or equal. Upon receipt of a qualified command, a second remote transceiver 39 will issue a RF signal 30 signal to the pickup truck 15 to unlock/lock the tailgate 20 in a manner similar to that aforementioned described. This communication can work in conjunction with previous commands and signal generation points issued to the mechanism 10 and offer enhanced remote control opportunity anywhere in the world.

The remote locking and unlocking features provided by the mechanism 10 are viewed as particularly advantageous on pickup truck 15 equipped with a protective bed cover 35 such as a tonneau cover (as depicted) or a bed shell. The implied security characteristics of the mechanism 10 provide physical protection against theft for items located inside of the bed area. Access convenience is thus provided by the wireless key fob transmitter 25 and can be utilized whether or not the tailgate 20 of the pickup truck 15 is equipped with a key lock or not in an independent manner.

Figure 2:
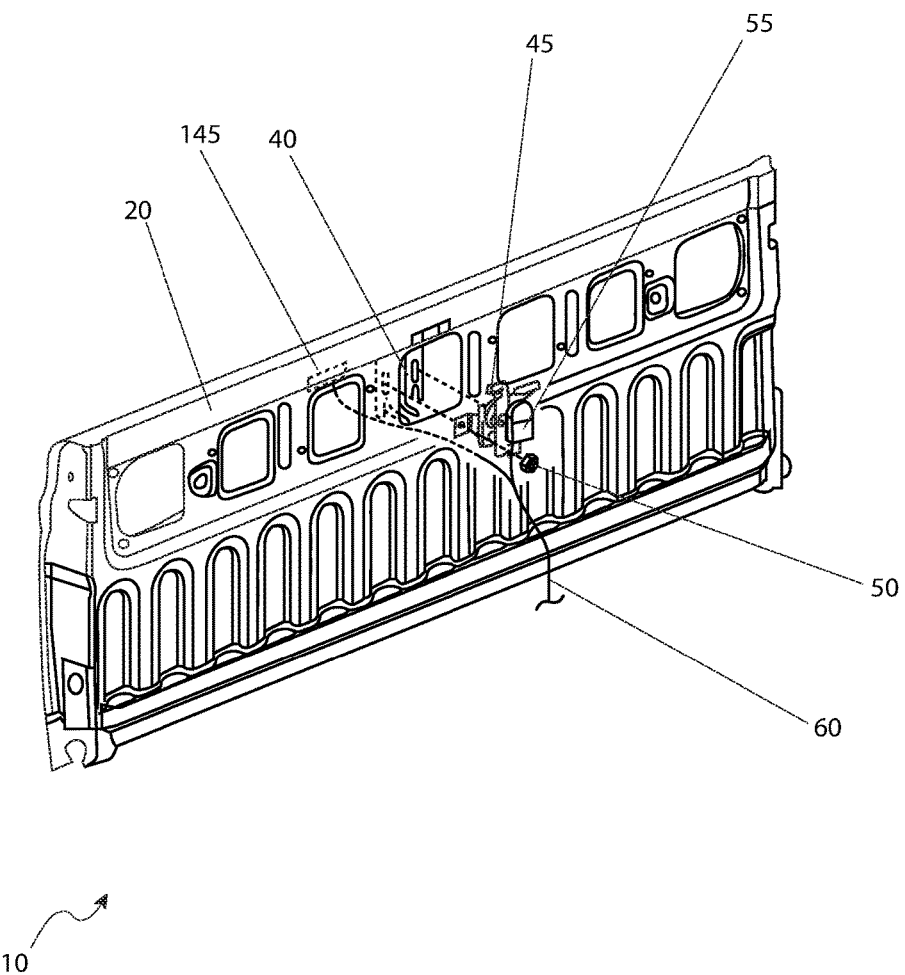
FIG. 2 is an exploded view of an interior of a tailgate 20, housing components of the remote electric locking mechanism for pickup truck tailgate 10, according to the preferred embodiment of the present invention.

Referring next to FIG. 2, an exploded view of the interior of the tailgate 20, housing components of the mechanism 10, according to the preferred embodiment of the present invention is depicted. The interior view is intended to be typical of the interior components as found on current late-model pickup trucks and is not intended to be all encompassing. An existing locking mechanism 40 is provided near the center of the tailgate 20. An auxiliary linkage mechanism 45 is attached and is held in firm physical connection by a fastening means 50 such as a bolt or nut. The auxiliary linkage mechanism 45 is provided with an electrical bidirectional solenoid 55 which provides for linear motion in two (2) opposite directions, one hundred eighty degrees (180°) apart. Said motion is accomplished by reversing the polarity to the electrical bidirectional solenoid 55, of the DC variety as found on motor vehicles. The electrical power to the electrical bidirectional solenoid 55 and the tailgate keypad 145 is provided by a wiring harness 60 which will be described in further detail herein below. The motion of the electrical bidirectional solenoid 55 is transferred by the auxiliary linkage mechanism 45 to the existing locking mechanism 40 to provide for locking and unlocking ability remotely. Once installed, the auxiliary linkage mechanism 45, the fastening means 50, and the electrical bidirectional solenoid 55 are not visible from the exterior of the tailgate 20.

Figure 3:
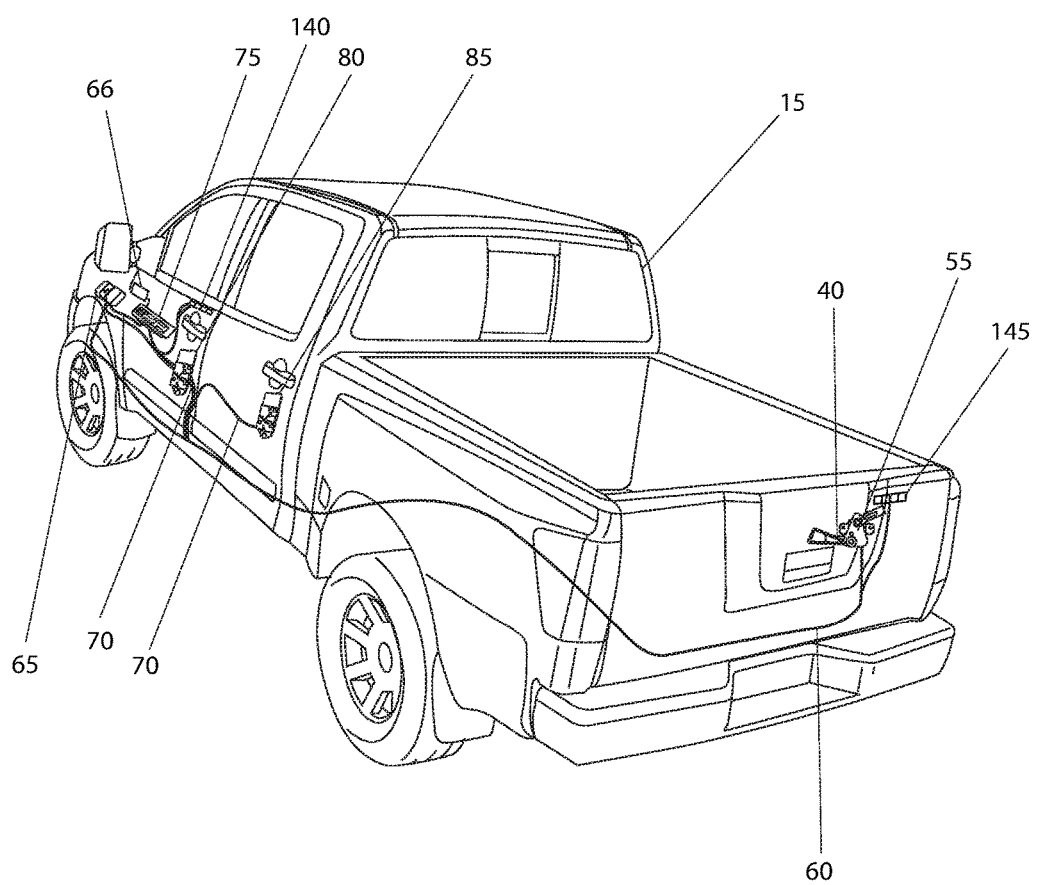
FIG. 3 is an isometric view of various components of the remote electric locking mechanism for pickup truck tailgate 10 inside of a pickup truck 15, according to the preferred embodiment of the present invention; and, FIG. 4 is a functional electrical block diagram of the remote electric locking mechanism for pickup truck tailgate 10, according to the preferred embodiment of the present invention.

Referring now to FIG. 3, an isometric view of various components of the mechanism 10 inside of a pickup truck 15, according to the preferred embodiment of the present invention is shown. The exterior outline of the pickup truck 15 is shown in a transparent view for purposes of illustration. The wiring harness 60 from the auxiliary linkage mechanism 45, the electrical bidirectional solenoid 55, and the tailgate keypad 145 is routed through the body of the pickup truck 15 following other wiring pathways used for other electrical wiring such as sensors, lights, switches and the like. It is terminated at a control relay with RF receiver 65 located, envisioned to be located within the engine compartment of the pickup truck 15. A remote data transceiver 66, such as an OnStar® vehicular services device, interfaces with the control relay with RF receiver 65 to provide access to the internet 38 (as shown in FIG. 1) along with associated remote control of the mechanism 10. A series of additional auxiliary wiring 70 paths connect the control relay with RF receiver 65 with an interior switch console 75, the driver's door keypad 140 as well as a driver's door locking solenoid 80 and a rear door locking solenoid 85 (if so provided on the pickup truck 15). A similar wiring path would also be established on the passenger side of the pickup truck 15, although not shown here due to illustrative limitations). It is accepted that the features and functions of the control relay with RF receiver 65, the auxiliary wiring 70, the interior switch console 75, the driver's door locking solenoid 80, the driver's door keypad 140, and the rear door locking solenoid 85 are not inclusive of the present invention, but are only depicted as an aid to describe the functionality of the present invention. The operation of the control relay with RF receiver 65 would be accomplished through user input via the interior switch console 75, the driver's door keypad 140, the tailgate keypad 145, or the wireless key fob transmitter 25 (as shown in FIG. 1).

Figure 4:
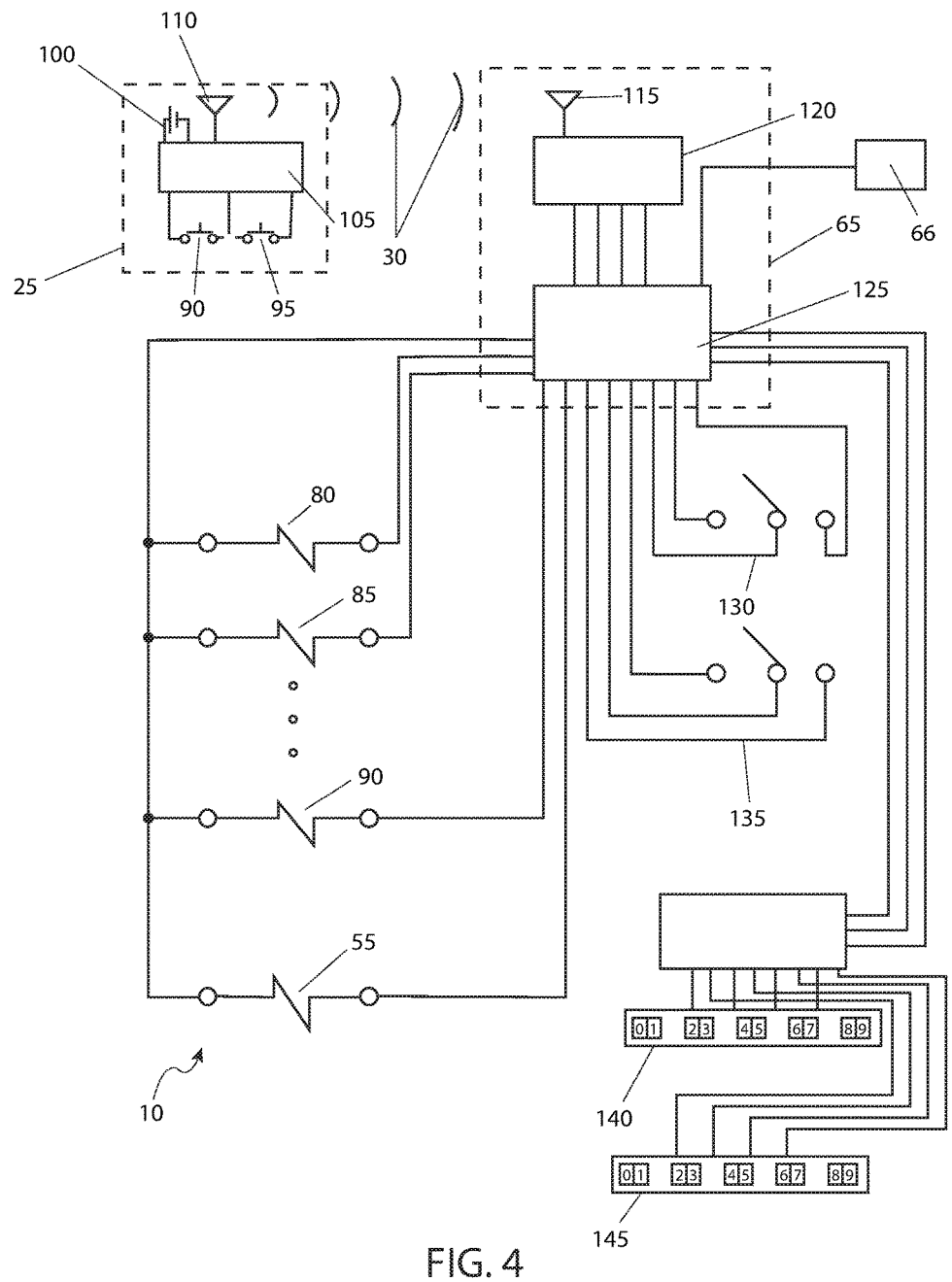

Referring finally to FIG. 4, a functional electrical block diagram of the mechanism 10, according to the preferred embodiment of the present invention is disclosed. The wireless key fob transmitter 25 provides for a lock pushbutton 90, an unlock pushbutton 95 and a power source 100, such as a coin cell battery, which provide an input to a transmitter module 105. A transmitting antenna 110, fed by the transmitter module 105 then produces the RF signal 30 which is picked up by a receiving antenna 115 and fed into a receiver 120. The receiver 120 is part of the control relay with RF receiver 65. The remote data transceiver 66, interfaces with the control relay with RF receiver 65 to provide access to the internet 38 (as shown in FIG. 1) as aforementioned described, along with associated remote control of the mechanism 10. Also, located within the control relay with RF receiver 65 is a relay module 125 which accepts various inputs and produces outputs of variable polarity. As aforementioned described, the receiver 120 and the relay module 125, as part of the control relay with RF receiver 65, is well known by those skilled in the art. The relay module 125 accepts additional inputs from a driver's door lock/unlock switch 130, as part of the driver's door locking solenoid 80 (as shown in FIG. 3) and a passenger's door lock/unlock switch 135. Both the driver's door lock/unlock switch 130 and the passenger's door lock/unlock switch 135 are capable of producing inverted polarity directly when working in conjunction with the relay module 125. The direct outputs of the relay module 125 are routed separately to the driver's door locking solenoid 80, the rear door locking solenoid 85 and the lock pushbutton 90 along with any other doors such as passenger doors. Additionally, an output is routed to the electrical bidirectional solenoid 55, also capable of being directed in an inverse polarity manner. The wiring as described in FIG. 4 is indicative of a wiring scheme in which the functionality of the mechanism 10 is inclusive to a new vehicle.

For those vehicles in which the functionality of the mechanism 10 is added as an aftermarket scenario, the two (2) wires from the electrical bidirectional solenoid 55 would be connected to an existing solenoid from another door on the vehicle. Such a circuit is a parallel connection and would provide identical locking functionality to the tailgate 20 (as shown in FIG. 1) as is provided to the door unto which the wiring is connected. As mentioned above, an alternate embodiment utilizes the functionality of a keypad 140 located on the driver's door and/or a tailgate keypad 145, both working through a matrix driver decoder circuit 150 to also actuate the auxiliary locking mechanism 45 of the tailgate 20.

The preferred embodiment of the present invention can be utilized by the common user in a simple and effortless manner with little or no training. It is envisioned that the mechanism 10 would be constructed in general accordance with FIG. 1 through FIG. 4. It is envisioned that the auxiliary linkage mechanism 45 would be connected mechanically to the existing locking mechanism 40 as described in FIG. 2 and connected electrically as described in FIGS. 3 and 4. An equal approach would be utilized whether the mechanism 10 is to be provided as part of standard or optional equipment on a new pickup truck 15 or as part of an aftermarket add-on for an existing pickup truck 15. Alternately, a user can actuate the auxiliary locking mechanism 45 with a keypad 140 located on the driver's door or a tailgate keypad 145 located on the tailgate 20. In an enhanced embodiment, an internet connected device 36 can be utilized to access alternative data control systems, such as OnStar® or equal, to control the mechanism 10.

Utilization and operation of the remote electric locking mechanism for pickup truck tailgate 10 once installed is accomplished by activating the wireless key fob transmitter 25, the driver's door lock/unlock switch 130, the passenger's door lock/unlock switch 135, the driver's door keypad 140, or the tailgate keypad 145. Exact operation is determined by the relay logic provided in the control relay with RF receiver 65 and is not intended to be part of the present invention nor limiting in scope. Operation of the mechanism 10 is intended to mimic operation of standard remote locking doors as provided on current model motor vehicles and is thus transparent to the typical user. Operation of the wireless key fob transmitter 25, the driver's door lock/unlock switch 130, the passenger's door lock/unlock switch 135, the driver's door keypad 140, or the tailgate keypad 145 will lock the tailgate 20 while subsequent operation of said devices will unlock the tailgate 20 in a repeating and cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A locking mechanism for a tailgate of a vehicle, comprising:
   a lock operatively connected to a handle of said tailgate; and
   an actuating means in electrical communication with said lock;
   wherein said actuating means selectively operates said lock to lock and unlock said handle;
   wherein said lock includes an auxiliary linkage with removable attachment to and providing operable communication with said handle and a bidirectional solenoid in operable communication with said auxiliary linkage in electrical communication with said actuating means in electrical communication with a power source of said vehicle;
   wherein said actuating means is a keypad located on a driver's side door of said vehicle;
   wherein said actuating means is a keypad located on a tailgate door of said vehicle;
   wherein said actuating means is operating said lock simultaneously with existing door locks of said vehicle;

wherein said actuating means is operating said lock simultaneously with existing door locks of said vehicle;

wherein said actuating means includes a keypad located on a tailgate door of said vehicle;

wherein said actuating means is a keypad located on a key fob;

wherein said actuating means is activating an existing security system of said vehicle;

wherein said actuating means includes an Internet communication.

2. The locking mechanism of claim 1, wherein said actuating means is a wireless network communication.

3. The locking mechanism of claim 2, wherein said actuating means is activating an existing security system of said vehicle.

4. A locking mechanism for a tailgate of a vehicle, comprising:

a lock operatively connected to a handle of said tailgate;

a first actuating means in electrical communication with said lock and a second actuating means in wireless communication with said lock;

wherein said first and second actuating means each independently selectively operate said lock to lock and unlock said handle;

wherein said lock further comprises an auxiliary linkage capable of removable attachment to and providing operable communication with said handle and a bidirectional solenoid in operable communication with said auxiliary linkage in electrical communication with said first and second actuating means in electrical communication with a power source of said vehicle;

wherein said first actuating means is a keypad located on a driver's side door of said vehicle;

wherein said first actuating means is operating said lock simultaneously with existing door locks of said vehicle;

wherein said first actuating means includes a keypad located on a tailgate door of said vehicle;

wherein said second actuating means is a keypad located on a key fob;

wherein said second actuating means is activating an existing security system of said vehicle;

wherein said actuating means includes an Internet communication.

5. The locking mechanism of claim 4, wherein said second actuating means is a wireless network communication.

6. The locking mechanism of claim 4, wherein said second actuating means includes a wireless network communication.

* * * * *